United States Patent [19]
Germanas et al.

[11] 3,919,341
[45] Nov. 11, 1975

[54] OLEFIN ISOMERIZATION PROCESS

[75] Inventors: Dalia Germanas, Des Plaines; Ernest L. Pollitzer, Skokie, both of Ill.

[73] Assignee: Universal Oil Products Company, Des Plaines, Ill.

[22] Filed: Jan. 22, 1974

[21] Appl. No.: 435,609

Related U.S. Application Data

[62] Division of Ser. No. 333,089, Feb. 16, 1973, Pat. No. 3,821,123.

[52] U.S. Cl. ............................................. 260/683.2
[51] Int. Cl.² ............................................. C07C 5/24
[58] Field of Search ................................ 260/683.2

[56] References Cited
UNITED STATES PATENTS 3,290,404    12/1906    Howman et al................. 260/683.2
3,301,916    1/1967    Pitkethly et al................. 260/683.2

*Primary Examiner*—Paul M. Coughlan, Jr.
*Attorney, Agent, or Firm*—James R. Hoatson, Jr.; Thomas K. McBride; William H. Page, II

[57] ABSTRACT

Double bond isomerization of olefins utilizing a catalyst comprising nickel and sulfur on a porous carrier; the catalyst being prepared by forming an initial composite of the nickel with the carrier material, sulfiding the initial composite to provide a sulfur/nickel atomic ratio of at least about 0.9 in the sulfided composite, and then stripping sufficient sulfur from the sulfided composite with hydrogen to provide a final isomerization catalyst composition having a sulfur/nickel atomic ratio of less than about 0.9 and more than about 0.55.

2 Claims, No Drawings

OLEFIN ISOMERIZATION PROCESS

CROSS-REFERENCE TO RELATED APPLICATIONS

This application is a division of our copending application Ser. No. 333,089, filed Feb. 16, 1973, U.S. Pat. No. 3,821,123.

BACKGROUND OF THE INVENTION

This invention concerns a process for isomerizing the double bond in olefins to provide different, isomeric olefins.

This invention further relates to a process for isomerizing the double bond of an olefin without undesirable polymerization of hydrogenation of the olefin.

A number of catalysts capable of isomerizing the double bond of an olefin are known in the art. Such catalysts are capable, for example, of converting butene-1 to butene-2, the 2-isomer being more valuable commercially than the 1-isomer. Many of the previously known catalysts have been found deficient in various ways, especially where they are employed under commercial operating conditions.

One serious drawback found in many previously disclosed olefin isomerization catalysts is their lack of selectivity. In an olefin isomerization operation, the catalyst must be selective for the double bond shift. For example, when it is desired to convert butene-1 to butene-2, a more valuable chemical, the catalyst must be capable of selectively catalyzing this double bond shift without converting the butene-1 to other compounds such as polybutenes, isobutylene, n-butane, or lower molecular weight hydrocarbons. In this case, selectivity refers to the ability of the catalyst to isomerize the double bond in the reactant compound without causing the reactant compound to polymerize, crack, or hydrogenate, or causing carbon chain rearrangement in the reactant compound.

In order for a double bond shift catalyst to be commercially acceptable, it must be active for the desired double bond shift at temperatures at which equilibrium between double bond isomers favors conversion to the desired double bond isomer, while remaining inert with respect to other compounds commingled with the reactant compound during the isomerization reaction. The olefins which it is desired to isomerize in commercial operations are generally available only in admixture with other hydrocarbons. For example, all economically feasible sources can provide butene-1 only in admixture with isobutylene. Because of the very similar boiling points of butene-1 and isobutylene, it is completely impractical to attempt to separate butene-1 from isobutylene by fractionation. Butene-2, on the other hand, can economically be separated from butene-1 and isobutylene by fractionation. Thus, in commercial operation for isomerizing butene-1 to provide butene-2, the butene-1 feed to the isomerization operation always contains a significant amount of isobutylene. In order to utilize an olefin isomerization catalyst in such an isomerization operation, the catalyst must be capable of catalyzing the conversion of butene-1 into butene-2 at temperatures where butene-2 is favored by equilibrium, while remaining inert to the isobutylene. It is well known in the art that certain olefins, particularly isobutylene, polymerize very readily to form high molecular weight hydrocarbons. Heretofore, it has been difficut to convert butene-1 into butene-2 in the presence of isobutylene without causing polymerization of the isobutylene. Except for diisobutylene, the polymers of isobutylene are of very little economic utility, while isobutylene itself is valuable as, for example, a feed stock for use in an isoparaffin-olefin alkylation operation. It is therefore undesirable to polymerize the isobutylene during an operation to isomerize the butene-1 to provide butene-2.

Because of the relative lack of success in using previously known catalysts to provide a stable operation while remaining active and selective at temperatures favorable to high olefin conversion rates, previous attempts to provide an olefin double bond isomerization process have generally not been completely successful. The process of the present invention overcomes selectivity and stability difficulties and provides a practical and desirable method for shifting the double bond in olefinic hydrocarbons.

SUMMARY OF INVENTION

It is an object of the present invention to provide a catalyst suitable for double bond isomerization of olefinic hydrocarbons.

Another object of the present invention is to provide a process for double bond isomerization of olefins.

Another object of the present invention is to provide an olefin isomerization catalyst which is selective for double bond isomerization of olefins.

Another object of this invention is to provide an olefin isomerization catalyst which possesses high activity for double bond isomerization.

A further object of this invention is to provide an olefin double bond isomerization catalyst which possesses stability of performance at high rates of conversion.

Another object of the present invention is to provide an olefin isomerization catalyst capable of converting butene-1 to provide butene-2 in the presence of isobutylene without causing polymerization of the isobutylene, and without rapid deactivation of the catalyst.

Another object of the present invention is to provide a process for isomerizing butene-1, while in admixture with isobutylene, to provide butene-2, without polymerizing the isobutylene.

Another object of the present invention is to provide an olefin isomerization process and catalyst capable of isomerizing linear olefins by double bond shift without hydrogenating the linear olefins to linear paraffins.

In an embodiment, the present invention relates to a process for isomerizing an isomerizable olefin which comprises contacting the olefin, at olefin isomerization conditions, with an olefin isomerization catalyst comprising a combination of a sulfur component and a catalytically effective amount of a nickel component with a porous carrier material, the catalyst containing less than about 0.9 and more than about 0.55 mole of sulfur per mole of the nickel component, calculated as the elemental metal, and the catalyst being prepared by the steps of: forming an initial composite of the nickel component and the carrier material, the nickel component being present in the initial composite in a form selected from the elemental metal or the oxide; sulfiding the initial composite by contacting same with a sulfide yielding compound at sulfiding conditions to provide a sulfided composite containing at least about 0.9 mole of sulfur per mole of the nickel component in the sulfided composite; and stripping sulfur from the resulting sulfided composite with a hydrogen-containing gas at stripping conditions to provide the olefin isomerization catalyst, sufficient sulur being stripped from the sulfided composite to provide a sulfur content in the catalyst of less than about 0.9 and more than about 0.55 mole of sulfur per mole of the nickel component in the catalyst.

By employing the catalyst and processing condition more fully described hereinafter, isomerizable olefins can be converted to different, isomeric olefins with a very high yield of the desired isomeric olefins. The catalyst of the present invention exhibits none of the undesirable characteristics of many catalysts, such as instability and lack of selectivity. Thus, isomerizable olefins may be converted to different, isomeric olefins in the present process without cracking, hydrogenation or polymerization of the reactant olefin, without rapid deactivation of the catalyst, and without adverse effects on any other hydrocarbons present during the isomerization operation. For exammple, butene-1 may e isomerized, while in admixture with isobutylene, to provide essentially equilibrium conversion of the butene-1 into butene-2, without the occurence of any adverse side reactions such as polymerization of isobutylene, hydrogenation of butene-1, or skeletal isomerization of any hydrocarbons in the feed stock. Moreover, the foregoing is accomplished under very moderate conditions of operation, thus providing savings in the capital and utilities requirements in commercial embodiments of the process.

DETAILED DESCRIPTION OF INVENTION

One essential feature of the present invention is a catalyst composition containing nickel and sulfur on a porous carrier material, or support, which exhibits surprising activity, selectivity and stability when employed as a catalyst for double bond isomerization of olefins. The method of preparation of the composition is a critical factor in insuring that the composition possesses the desired high isomerization activity while, at the same time, exhibiting both excellent stability over long periods of use and surprising inertness to diluent hydrocarbons, even in the presence of very easily polymerizable diluent materials such as isobutylene, as well as lack of hydrogenation of the reactant olefin to a paraffin.

The first step in the preparation of the catalytic composition of the present invention is the formation of an initial composite of the nickel component with the porous carrier material. The nickel component in the initial composite is in the form of reduced nickel, i.e., the elemental metal, or else is in the form of nickel oxide. Either the oxide or the elemental metal may be used with good results. The amount of nickel in the initial composite, calculated on the basis of the elemental metal, is between about 5 wt.% and about 80 wt.% of the total weight of the initial composite, with a preferred range of nickel content being about 10 wt.% to about 60 wt.% of the total initial composite.

The porous carrier material employed in the present catalyst composition is relatively inert and refractory under the condition employed in the isomerization operation. A variety of suitable support materials may be employed in the catalyst. For example, any of the following may be utilized to provide the porous carrier material within the scope of this invention: activated carbon, coke or charcoal; silica, silica gel, synthetic or naturally occurring silicate such as kieselguhr, attapulgus clay, china clay, fullers earth, kaoline, etc., and refractory inorganic oxides such as alumina, titania, zirconia, chromia, zinc oxide, magnesia, thoria, boria, etc., as well as mixtures and combinations of the above. The preferred porous carrier materials are refractory inorganic oxides, especially silica, alumina, and kieselguhr.

The initial composite of the nickel component and the carrier material may be prepared in any suitable conventional manner. For example, the carrier may be formed into spheres or pellets or extruded, pilled, etc. The nickel component is then impregnated thereon by contacting the carrier with a solution of a soluble and heat-decomposable nickel compound and evaporating the solute, leaving a nickel compound deposited on the carrier. The composite is then heated to decompose the nickel compound, the nickel being converted into the oxide or elemental metal, depending upon the heating atmosphere. Another suitable method for preparing the initial composite of the nickel component and the porous carrier material is by coextrusion. In this operation, an aqueous refractory inorganic oxide sol is admixed with a water soluble nickel compound such as nickel nitrate, nickel sulfate or nickel chloride. The aqueous mixture is then combined with an aqueous alkaline solution of, for example, ammonium hydroxide, ammonium carbonate, or the like, to precipitate a mass of finely-divided particles. The mass of particles produced is then partially dried and compressed or extruded by conventional means to form pills, pellets, etc. The particles are heated and dried to convert the nickel to the elemental metal or oxide. Various other known methods for forming the initial composite of nickel component and carrier are also suitable, including, for example, forming a mixture of dry, finely-divided particles of the porous carrier with finely-divided particles of nickel or a nickel compound, extruding or compressing the mixture into pills or pellets, and heating, if necessary to decompose the nickel compound to the oxide or elemental metal.

One preferred method for forming the initial composite of the nickel component with the carrier includes treating an inorgnaic oxide particles with an aqueous solution of a soluble nickel compound. Generally, the inorganic oxide particles utilized will have been basic aged and water washed. For example, the inorganic gel particles may comprise spheroidal particles of uniform physical characteristics formed by dispersing an inorganic oxide hydrosol in the form of droplets into a suitable gelling medium and immediately thereafter subjecting the resulting gel shperes to an aging treatment in a basic medium. The gelling medium may be any suitable immiscible suspending liquid, usually a light gas oil chosen principally for its high interfacial tension with respect to water. Basic aging is usually accomplished by initially commingling a weak base such as urea, hexamethylenetetramine, or the like, with the hydrosol before dispersing the same in the gelling medium as described above. During the subsequent aging process, the weak base retained in each gel particle continues to hydrolize, forming ammonia and carbon dioxide. Generally, the spheres are retained in the gelling medium at a temperature of 120°F. to 210°F. in a separate vessel to complete the aging process. The aging process usually further comprises an aqueous ammonia treatment before a final water wash to remove soluble matter. The basic aged, water washed, spherical gel particles, with extraneous wate decanted or filtered therefrom, are then calcined at about 400°C., usually in an air atmosphere, and subsequently further treated with a solution of a soluble compound of nickel such as nickel nitrate, nickel sulfate, nickel chloride, or nickel acetate. The particles are soaked in the water-soluble nickel compound solution for about 1 to about 2 hours at room temperature and thereafter evaporated to dryness in, for example, a rotary steam dryer. The dried composite is then heated at about 100°C. to about 300°C. for 1 to 2 hours. If the heating is performed in an air atmosphere, the resulting initial composite of nickel component and carrier material will contain nickel in the form of the oxide.

Another preferred method of preparing the initial composite of the nickel component with the carrier, when the carrier material is kieselguhr or the like, is by adding a hot aqueous solution containing the required amount of nickel sulfate or nitrate to a suspension of kieselguhr in water and subsequently heating the resultant mixture at a temperature of about 60° to about 80°C. while a hot aqueous solution of sodium carbonate is added thereto with stirring to precipitate nickel carbonate and upon the kieselguhr. This precipitation is usually carried out at a temperature of about 60° to about 80°C. and particularly good results are obtained at about 70°C. It has been found desirable to add about 1.7 molar proportions of sodium carbonate per atomic portion of total nickel ions in order that the finished catalyst will have the desired consistency. The mixture of nickel carbonate and kieselguhr may then be separated from the aqueous solution by filtration. The solid material is dried, mixed with about 4 percent by weight of finely-divided graphite to act as a pelleting lubricant and formed into pellets by, for example, a pilling machine. The pelleted material may then be heated in air at about 300° to about 400°C. to decompose the nickel carbonate into nickel oxide. After the evolution of carbon dioxide has substantially ceased, the resultant mixture of nickel oxide and kieselguhr may be utilized directly as the initial composite, or the nickel may be converted to the elemental metal by heating the composite in a stream of hydrogen at a temperature up to about 550°C.

The next essential step in producing the catalytic composition, after the formation of the initial composite of the nickel component with the carrier material, is sulfiding of the composite to produce a sulfided composite containing at least about 0.9 mole of sulfur per mole of nickel, ie., the initial composite is subjected to sulfiding conditions sufficient to provide the sulfided composite with a sulfur/nickel atomic ratio of about 0.9 or more. The initial composite is sulfided by contacting it with a sulfide-yielding compound at sulfiding conditions. The sulfide-yielding compound utilized in this step may be any inorganic or organic sulfide-containing compound capable of producing nickel sulfide when contacted with the initial composite of the nickel component and carrier material at sulfiding conditions. One suitable sulfide-yielding compound is hydrogen sulfide. Ammonium sulfide, ammonium hydrosulfide, the alkyl and aryl mercaptans, organic and inorganic soluble sulfides and organic thioethers, disulfides, thioaldehydes, thioketones and the like sulfur-containing compounds may also be employed, although not necessarily with equivalent results. Although the sulfiding step may in some cases be performed under liquid phase conditions, the preferred procedure involves contacting a gas stream containing the sulfide-yielding compound with the initial composite. Accordingly, the sulfide-yielding compounds which are more preferred are volatile at the hereinafter specified sulfiding conditions. In general, best results in the sulfiding step have been obtained when the sulfide-yielding compound is hydrogen sulfide in solution in a major portion of hydrogen. The sulfiding conditions utilized are selected to produce a reaction between the nickel component of the initial composite and the sulfur-containing sulfiding material in order to form a nickel sulfide-containing composite. Ordinarily, temperatures ranging from about 10°C. up to about 550°C. or more are operative, with the preferred temperatures being about 20°C. to about 450°C. when hydrogen sulfide is utilized. The temperature employed may vary, depending on the strength of the sulfiding agent, etc. The pressure utilized can be selected from an extremely broad range and does not greatly effect the course of the sulfiding step. Ordinarily, atmospheric or subatmospheric pressures can be utilized with good results. It is ordinarily preferred to continue the sulfiding operation until the composite no longer reacts with the sulfide-yielding compound.

A preferred method for sulfiding the initial composite is by passing a mixture of hydrogen sulfide and hydrogen over the initial composite. Good results are obtained when the amount of hydrogen sulfide is between about 5 and about 30 percent of the hydrogen in the mixture. The temperature maintained during the preferred sulfiding operation is about —°C. to about 450°C. The gaseous hydrogen sulfide-hydrogen mixture is preferably passed over the composite at the rate of about 250 cc. to about 1,000 cc. per minute per 100 cc. of composite. The sulfiding operation is continued until the amount of sulfur in the composite, in the form of the sulfide, is at least about 0.9 mole of sulfur per mole of nickel in the composite and preferably about 1 mole or more of sulfur per mole of nickel. Excess hydrogen sulfide is then purged from the sulfided composite.

The third essential step in producing the catalytic composite of the present invention, after the formation of the initial composite of the nickel component and the porous carrier and sulfiding of the initial composite, is the removal of a critical amount of sulfur from the sulfided composite by stripping he sulfided composite with a hydrogen-containing gas at stripping conditions to provide the catalyst utilized in the present isomerization operation. The gas utilized in the stripping operation may be pure hydrogen or may be a mixture of hydrogen with gases substantially inert in the stripping operation such as nitrogen, argon, etc. Pure hydrogen gas is preferred for use. The stripping operation generally includes continuously passing the hydrogen-containing gas over the sulfided composite, but may also be conducted in a batch-type operation in which a quantity of hydrogen-containing gas is contacted with the particular quantity of sulfided composite to be stripped for a specified period of time at the desired temperature and pressure, and the gas is subsequently purged or otherwise removed from contact with the stripped composite. In such a batch-type operation, a large number of repetitions of the operation will generally be required. A continuous stripping operation is preferred because of its obviously greater ease of operation and more rapid results in stripping the desired amount of sulfur from the sulfided composite to form the desired catalyst composition. The continuous operation includes continuously passing a stream of hydrogen-containing gas, preferably pure hydrogen, over the sulfided composite. The stripping operation can be performed in a fairly broad temperature range, e.g., about 200°C. to about 600°C. or more. In order to determine the amount of sulfur stripped from the sulfided composite, the amount of the sulfur in the sulfided composite can be determined by analysis before commencing the stripping operation. The stripping operation is then started and continued, with the amount of sulfur removed being continuously detemined by analysis of the hydrogen-containing gas stream after it is passed over the sulfided composite. Preferably, the hydrogen-containing gas is passed over the sulfided composite at the rate of about 250 cc. to about 2,000 cc. per minute of hydrogen per 100 cc. of the sulfided composite. Preferably a temperature of about 300°C. to about 600°C. or more is maintained during the stripping operation, with a temperature of about 400°C. to about 600°C. especially preferred. At stripping temperatures higher than 600°C. the porous carrier material employed in the composite may suffer deleterious results, especially from prolonged stripping operations. Generally, the amount of sulfur which can be stripped away from the sulfided composite is relatively small. It is very difficult to strip enough sulfur from the sulfided composite to provide a final catalyst having less than about 0.7 mole of sulfur per mole of nickel. The time and temperatures involved in stripping enough sulfur from the comosite to obtain a final sulfur/nickel mole ratio less than 0.55 substantially prohibit forming a final catalyst having such a composition. Since excellent results can be obtained using a catalyst having sulfur/nickel mole ratios as high as 0.8 to 0.9, the preferred ratio is about 0.6 to about 0.9. After the desired amount of sulfur has been stripped from the sulfided composite so that less than 0.9 mole and greater than 0.55 mole of sulfur remains in the composite per mole of nickel in the composite, calculated as the elemental metal, the stripping operation is discontinued and the final catalytic composite is then ready for use in the isomerization operation of the present invention. The nickel in the finished catalyst should be present in a catalytically effective amount, generally about 5 wt.% to about 80 wt.% of the finished catalyst. A preferred range of nickel content in the finished catalyst is about 10 wt.% to about 60 wt.%.

The catalyst of the present invention can in general be employed in the isomerization of the olefinic double bond of a variety of olefins. Olefins which may be isomerized using the process of the present invention include generally all mono-olefins in which the olefinic bond is shiftable to convert the olefin to a different isomeric olefin. Specific isomerizable olefins include butene-1, butene-2, methylbutenes and n-pentenes, hexenes, decenes, etc. The present process produces essentially equilibrium conversion of an isomerizable reactant olefin. For example, use of a particular butene or pentene isomer as the reactant in the present process will convert the reactant olefin to an equilibrium mixture of butene double bond isomers or pentene double bond isomers, respectively.

The preferred olefins for use in the present isomerization process are butenes. It is well known in the art that butene-1 is only available on a commercial scale commingled with at least some isobutylene. This is primarily because of the similar boiling point of butene-1 and isobutylene, which render their separation by fractionation infeasible. The commercial operations which are the only available sources of $C_4$ olefins, e.g. fluid catalytic cracking and thermal cracking operations, provide butene-1 and butene-2 supplies which contain at least about 10–20% isobutylene, while the amount of isobutylene in the $C_4$ olefin supplies produced in these operations is often as high as 50–60% of the $C_4$ olefins content. Butene-2, which is more valuable as a chemical precursor than butene-1, can be separated from the other two $C_4$ olefin isomers by fractionation, so that by isomerizing the butene-1 fraction it is then possible to recover substantially all the linear $C_4$ olefins as butene-2 by fractionating the $C_4$ olefins to separate butene-2 from isobutylene and butene-1. The isobutylene and butene-1 can be recycled to the isomerization operation so that substantially all of the butene-1 can be converted to butene-2 and subsequently separated rom the isobutylene. In such an operation, a drag stream containing a high concentration of isobutylene must be removed from the recycle stream of butene-1 and isobutylene in order to prevent a buildup of isobutylene in the operation.

An olefin to be isomerized in the process of the present invention may be utilized in the form of a pure compound or may be admixed with other olefins,, saturated hydrocarbons, aromatics, etc., or any other material which is relatively inert at the isomerization conditions employed. Commercially available olefin feed stocks generally contain the reactant olefin in admixture with at least one saturated hydrocarbon, since, in order to recover all the reactant olefin from a particular source, at least some saturatd hydrocarbons are also necessarily recovered because of imprecise fractionation and economic limitations. Such saturate-diluted feed stocks are generally preferred for use in the present process. For example, commercial sources of butene-1 generally supply the butene-1 in admixture with saturated hydrocarbons such as propane, isobutane, etc. The primary commercial sources of butene-1 are catalytic and thermal petroleum cracking operations. A typical butene-1 feed stock supplied to the present isomerization process from such a cracking operation might contain 30–70 vol.% isobutane and/or propane. Such a feed stock is suitable for use in the present process. As described above, isobutylene is almost invariably present in commercially available supplies of butene-1. For example, a typical fluid catalytic cracking operation might supply a butene-1 feed stock suitable for use in the present process which contains 5 vol.% propane, 10 vol.% butene-1, 15 vol.% butene-2, 25 vol.% isobutylene, and 45 vol.% isobutane. It is apparent from this example that a process for isomerizing the butene-1 component of such a feed stock must be selective for the desired double bond isomerization reaction, and inert to other hydrocarbons.

Olefin isomerization conditions useful in the process of the present invention include a temperature of about 25°C. to about 200°C. The preferred temperature range is from about 75°C. to about 160°C. Although isomerization can be effected when the present process is performed using liquid phase operations, it has been found that the catalyst of the present invention deactivates fairly rapidly unless vapor phase operations are maintained. Thus, the pressure preferred in the present process is that chosen to provide vapor phase operations at the particular temperature desired for use. In general, a pressure of subatmospheric to about 30 atmospheres is satisfactory. Normally the operations should be conducted with the temperatures and pressure above the dew point of the least volatile component of the olefin-containing feed stock employed in the process. The reaction times utilized in the present process are preferably calculated, in general, on the basis of the volume of olefinically unsaturated hydrocarbons (excluding propylene) which are contacted with the catalyst. For example, using a feed stock containing propane, butene-1, isobutylene, butadiene and isobutane, the reaction time is preferably calculated on the basis of the volume of combined butene-1, isobutylene and butadiene employed. In a preferred, continuous operation, this space velocity is referred to as the "olefin space velocity," which is intended to describe the space velocity of all $C_4$ and heavier olefinically unsaturated hydrocarbons in the feed stock employed, irrespective of the exact amounts of saturates, hydrogen, etc., which are utilized. Thus, in the preferred continuous operation, an olefin liquid hourly space velocity (liquid volume of $C_4$ and heavier olefins per hour per volume of catalyst employed) of about 0.5 to about 20 may suitably be employed. An olefin liquid hourly space velocity of about 1 to about 10 is preferred. At lower space velocities, a lower temperature may generally be employed. The space velocity and temperature are normally adjusted according to the content of the feed stock to give high conversions at the highest possible space velocity with vapor phase operations. Some hydrogen is required in the operation for satisfactory performance. At least about 0.01 mole of hydrogen should be charged to the isomerization operation for every mole of unsaturates charged, and preferably about 0.1 mole of hydrogen is admixed with each mole of feed stock. More hydrogen may be required when large amounts of sulfur and/or polyolefins such as butadiene are present in the olefin feed stock employed. One significant advantage of the present process is that the isomerization operation is not adversely effected by fairly high water levels in the feed stocks employed. For example, a water level of 200 ppm. in the feed has substantially no effect on the operation.

The isomerization process of the present invention may be performed using any suitable reactor known to the art. A batch-type operation may be employed, in which a fixed portion of olefin-containing feed stock and a specific amount of the catalyst of the present invention are placed in an appropriate vessel, such as an autoclave, and contacted therein for an appropriate length of time. The isomerized charge stock is then withdrawn from the vessel and the isomerized olefin is recovered. The preferred mode of operation is a continuous-type operation. The catalyst may be utilized as a fixed bed, with the hydrocarbon charge stock continuously being passed over the bed. The catalyst may also be employed in a moving bed operation including both countercurrent and co-current operations. The preferred mode of operation is a continuous fixed bed operation in which the reactant olefin is continuously passed into the reactor and downwardly of the catalyst and then withdrawn continuously from the reactor. A large variety of conventional reactors suitable for use in the present process will be obvious to those skilled in the art from the foregoing.

EXAMPLE I

An initial composite of nickel and kieselguhr was prepared by suspending kieselguhr in an aqueous solution of nickel nitrate containing a calculated amount of nickel to give a nickel-kieselguhr composite containing 50 wt.% nickel. The mixture of nickel nitrate solution and kieselguhr was heated to 70°C., precipitated with sodium carbonate, filtered, washed, dried, pilled and heated at 300°–400°C. to decompose nickel carbonate to nickel oxide. The oxide was then reduced in a stream of hydrogen at 400°C. to reduce the nickel to the elemental metal form. The composite was then analyzed and found to contain 50 wt.% nickel, as the elemental metal, and 50 wt.% kieselguhr. This composition was designated Catalyst A.

EXAMPLE II

A 1000 cc. sample of Catalyst A was sulfided by passing over it a stream of hydrogen containing 10% hydrogen sulfide and maintained at 400°C. until no futher hydrogen sulfide was found to react with the composite. This sulfided composite was analyzed and found to have a sulfur/nickel mole ratio of 1.1. This composite was designated Catalyst B.

EXAMPLE III

A 100 cc. sample of Catalyst B was stripped by passing a stream of hydrogen over it at the rate of 1.000 cc. per minute at a temperature of 300°C. for 4 hours. This catalytic composite was analyzed and found to have a sulfur/nickel mole ratio of 1.0. It was designated Catalyst C.

EXAMPLE IV

Another 100 cc. sample of Catalyst B was obtained and stripped by passing 1,000 cc. per minute of hydrogen over it at 400°C. for 4 hours. Analysis of the stripped composite showed it to have a sulfur/nickel mole ratio of 0.89. This composite, prepared in conformance with the present invention, was designated Catalyst D.

EXAMPLE V

Another 100 cc. sample of Catalyst B was stripped by treating it with a stream of 1,000 cc. per minute of hydrogen at a temperature of 500°C. for 4 hours. Analysis showed the sulfur/nickel mole ratio of this composite, prepared in accordance with the present invention, to be 0.85. This composite was designated Catalyst E.

EXAMPLE VI

A further 100 cc. sample of Catalyst B was stripped by passing 1,000 cc. per minute of hydrogen over it at a temperature of 600°C. for 4 hours. Analysis of the resulting sulfided and stripped composite, prepared according to the present invention, showed it to have a sulfur/nickel mole ratio of 0.76. This composite was designated Catalyst F.

EXAMPLE VII

A conventional spherical alumina base was impregnated with a solution of sufficient nickel nitrate to produce a calcined and reduced composite containing 25 wt.% nickel. The dried composite was heated to 300°C. to decompose the nitrate and form nickel oxide. The nickel was then reduced to the elemental metal by passing a stream of hydrogen over the composite at 400°C. The resulting composite of 25 wt.% elemental nickel on alumina was designated Catalyst G.

EXAMPLE VIII

A 500 cc. sample of Catalyst G wa sulfided by passing over it a stream of hydrogen containing 10% hydrogen sulfide. A temperature of 400°C. was maintained during the sulfiding step. Sulfiding was continued until no further uptake of hydrogen sulfide into the catalyst was observed. The sulfur/nickel mole ratio in the completely sulfided nickel-alumina composite was found to be 0.95. This composite was designated Catalyst H.

EXAMPLE IX

A 100 cc. sample of Catalyst H was stripped by passing over it a stream of 1,000 cc. per minute of hydrogen at 400°C. for 4 hours. The stripped composite was analyzed and found to have a sulfur/nickel mole ratio of 0.69. This composite, prepared according to the present invention, was designated Catalyst I.

EXAMPLE X

Another 100 cc. sample of Catalyst H was stripped in a stream of hydrogen at 1,000 cc. per minute and a temperature of 600°C. for 4 hours. The resulting sulfided and stripped composite, prepared in accordance with the present invention, was analyzed and found to have a sulfur/nickel mole ratio of 0.57. This composite was designated Catalyst J.

EXAMPLE XI

A 100 cc. sample of Catalyst G (25% elemental nickel on alumina) was treated with a stream of hydrogen containing 10% hydrogen sulfide at ambient temperature until no further reaction of hydrogen sulfide with the composite was observed. This sulfided composite was then stripped with hydrogen at 400°C. for 4 hours. Analysis of the resulting composite showed it to have a sulfur/nickel mole ratio of only 0.18, i.e., outside the range of values for the sulfur/nickel mole ratio of the catalyst of the present invention. This composite was designated Catalyst K.

EXAMPLE XII

Catalysts A through H were compared in vapor phase isomerization of butene-1 in admixture with isobutylene. In each run, exactly the same amount of catalyst was used in the same conventional reactor. The feed stock employed contained 55–60 mole % propane diluent and 2:1 butene-1/isobutylene volume ratio. The amount of hydrogen used was that which would dissolve in the hydrocarbon feed stock at ambient temperature and 8.5 atmospheres pressure. Reactor pressure was maintained at 13.6 atmospheres. The feed stock was initially charged at a liquid hourly space velocity (volume of all hydrocarbons charged per hour per volume of catalyst) of 3.5 and a temperature of 100°C., and the temperature was adjusted to provide a conversion of 70–80 percent. Generally, a particular run was terminated if conversion was low at 140°C. In each case, the effluent from the reactor was analyzed. The results are shown in Table I.

EXAMPLE XIII

Catalysts D, I, J and K were compared under exactly the same conditions employed in the runs described in Example XII except that the feed stock contained 0.2 mole % 1,3-butadiene and hydrogen was charged with the hydrocarbons at the rate of 1 liter per hour per 10 cc. of catalyst. The results are shown in Table II.

TABLE I

| Catalyst | | A | B | C | D | E | F | G | | H |
|---|---|---|---|---|---|---|---|---|---|---|
| Sulfur/Nickel ratio | | 0 | 1.1 | 1.0 | 0.89 | | 0.85 | 0.76 | 0 | 0.95 |
| Hrs. in use | | 80 | 270 | 20 | 20 | 60 | 660 | 140 | 80 | 20 | 35 | 15 |
| Reactor Temp. °C. | | 110 | 140 | 140 | 140 | 143 | 145 | 123 | 115 | 130 | 130 | 140 |
| C₄ components in Product (Mole % of C₄) | (Feed) | | | | | | | | | | |
| isobutylene | 32–35 | 33.2 | 33.9 | 33.5 | 33.4 | 33.6 | 32.5 | 32.5 | 32.7 | 33.0 | 32.9 | 34.0 |
| butene-1 | 65–68 | 19.6 | 14.8 | 59.0 | 46.6 | 16.4 | 10.8 | 12.7 | 12.9 | 34.0 | 46.1 | 59.0 |
| butene-2 | 0 | 47.2 | 51.2 | 7.5 | 20.0 | 50.0 | 56.7 | 54.8 | 54.4 | 33.0 | 21.0 | 7.0 |
| % Conversion (Mole % butene-2/Mole % butene-1 and butene-2) | | 70.6 | 77.6 | 11.3 | 30.0 | 75.3 | 84.0 | 81.2 | 80.8 | 51.5 | 31.3 | 10.6 |

TABLE II

| Catalyst | | D | I | J | K |
|---|---|---|---|---|---|
| Sulfur/Nickel Ratio | | 0.89 | 0.69 | 0.57 | 0.18 |
| Hrs. in use | | 1000 | 140 | 160 | 55 |
| Reactor Temp. °C. | | 124 | 128 | 126 | 98 |
| C₄ Components in Product (Mole % of C₄'s) | (Feed) | | | | |
| n-butane | 0.0 | 0.0 | 0.0 | 0.0 | 1.3 |
| isobutylene | 32.8 | 32.6 | 32.2 | 32.5 | 31.9 |
| butene-1 | 67.0 | 13.1 | 12.1 | 12.6 | 12.6 |
| butene-2 | 0.0 | 54.3 | 55.7 | 54.9 | 54.2 |
| 1,3-butadiene | 0.2 | 0.0 | 0.0 | 0.0 | 0.0 |
| % Conversion (Mole % butene-2/Mole % butene-1 and butene-2) | | 80.5 | 82.2 | 81.3 | 81.1 |

Referring to Table I, the surprising activity and stability of the catalyst compositions prepared according to the present invention (Catalysts D, E and F) are apparent. For example, Catalyst D, after 660 hours of continuous use in isomerization, produced the highest level of conversion achieved by any of the compositions, and this high level of conversion was maintained with only a 2°C. temperature rise in 600 hours. Catalyst E and F also attained very high conversion rates which were particularly desirable because of the relatively low temperatures at which these catalysts exhibited stable activity. In contrast, Catalyst A (elemental nickel) was found to be unstable and also relatively low in activity. The sulfided nickel catalysts, B and C, were almost completely inactive. The very low activity of Catalyst C is particularly significant in that it illustrates the critical nature of the sulfur/nickel mole ratio in the catalyst. Merely stripping some sulfur from a completely sulfided composite (such as Catalyst B) is not sufficient, as shown by the low activity of Catalyst C. Yet when sufficient sulfur is stripped to provide a catalyst with a sulfur/nickel mole ratio below about 0.9 (Catalyst D), activity and stability result.

Referring to Table II, it can be seen that catalysts prepared according to the present invention (Catalysts D, I and J) are capable of isomerizing butene-1 at very high activity and excellent stability and selectivity, while hydrogenating butadiene. Catalyst K, prepared with a sulfur/nickel mole ratio below the level of the catalysts of the present invention, was found to hydrogenate the linear butenes to form substantial amounts of n-butane, even when operated at low temperatures, i.e., Catalyst K was found to lack selectivity. Catalyst K was, therefore, inferior as an isomerization catalyst, since hydrogenation to n-butane is a very undesirable side reaction in such an operation.

From the foregoing description and examples, it is apparent that the catalyst of this invention is surprisingly and substantially superior to other nickel catalyst compositions. The process of this invention offers a particularly advantageous method for isomerizing the olefinic in isomerizable olefins, giving extremely high rates of conversion to a desired olefin isomer over extremely long periods of use. The desired isomerization reactions are catalyzed by the present catalyst without hydrogenation, polymerization or other deleterious side reactions involving the reactant olefin or easily polymerizable diluent material such as isobutylene.

We claim as our invention:

1. A process for isomerizing an isomerizable olefin which comprises contacting the olefin, at olefin isomerization conditions, with an olefin isomerization catalyst comprising a combination of a sulfur component and a catalytically effective amount of a nickel component with a porous carrier material, the catalyst containing less than about 0.9 and more than about 0.55 mole of sulfur per mole of the nickel component, calculated as the elemental metal, and the catalyst being prepared by the steps of: forming an initial composite of the nickel component and the carrier material, the nickel component being present in the initial composite as the elemental metal or the oxide; sulfiding the initial composite by contacting same with a sulfide yielding compound at sulfiding conditions to provide a sulfided composite containing at least about 0.9 mole of sulfur per mole of the nickel component in the sulfided composite; and stripping sulfur from the resulting sulfided composite with a hydrogen-containing gas at stripping conditions to provide the olefin isomerization catalyst, sufficient sulfur being stripped from the sulfided composite to provide a sulfur content in the catalyst of less than about 0.9 and more than about 0.55 mole of sulfur per mole of the nickel component in the catalyst.

2. A process according to claim 1 wherein said olefin is butene-1.

* * * * *